United States Patent

Wilkes

(10) Patent No.: US 9,284,106 B2
(45) Date of Patent: Mar. 15, 2016

(54) BOTTLE REGISTRATION FEATURE

(71) Applicant: Smart Bottle, Inc., Asheville, NC (US)

(72) Inventor: Kenneth R. Wilkes, Asheville, NC (US)

(73) Assignee: Smart Bottle, Inc., Asheville, NC (US)

(*) Notice: Subject to any disclaimer, the term of this patent is extended or adjusted under 35 U.S.C. 154(b) by 285 days.

(21) Appl. No.: 13/656,170

(22) Filed: Oct. 19, 2012

(65) Prior Publication Data

US 2013/0098863 A1 Apr. 25, 2013

Related U.S. Application Data

(60) Provisional application No. 61/550,482, filed on Oct. 24, 2011.

(51) Int. Cl.

| | | |
|---|---|---|
| B65D 23/00 | (2006.01) |
| B65D 75/58 | (2006.01) |
| B65D 1/02 | (2006.01) |
| B65D 41/04 | (2006.01) |
| B65D 41/34 | (2006.01) |
| B29C 49/46 | (2006.01) |
| B65D 47/08 | (2006.01) |
| B29C 49/00 | (2006.01) |
| B29C 49/02 | (2006.01) |
| B29C 49/22 | (2006.01) |

(52) U.S. Cl.
CPC .......... *B65D 75/5883* (2013.01); *B29C 49/46* (2013.01); *B65D 1/023* (2013.01); *B65D 41/0471* (2013.01); *B65D 41/0492* (2013.01); *B65D 41/3447* (2013.01); *B29C 2049/0057* (2013.01); *B29C 2049/021* (2013.01); *B29C 2049/227* (2013.01); *B29C 2049/4664* (2013.01); *B65D 47/0847* (2013.01); *Y10T 29/49826* (2015.01)

(58) Field of Classification Search
None
See application file for complete search history.

(56) References Cited

U.S. PATENT DOCUMENTS

| | | |
|---|---|---|
| 3,358,062 A | 12/1967 | Lemelson |
| 3,367,380 A | 2/1968 | Dickey |
| 3,632,252 A | 1/1972 | Amberg et al. |
| 4,220,248 A | 9/1980 | Wilson et al. |
| 4,310,097 A | 1/1982 | Merl |
| 4,846,915 A | 7/1989 | Keeler et al. |
| 4,867,354 A * | 9/1989 | Schreiber ............ 222/521 |
| 5,110,017 A | 5/1992 | Braun |
| 5,110,041 A | 5/1992 | Keeler |

(Continued)

FOREIGN PATENT DOCUMENTS

GB 2194507 3/1988

OTHER PUBLICATIONS

International Search Report and Written Opinion dated Mar. 1, 2013 from related/corresponding International Patent Application No. PCT/US12/61438, filed Oct. 23, 2012.

*Primary Examiner* — Monica Huson
(74) *Attorney, Agent, or Firm* — Clark Hill PLC

(57) ABSTRACT

A fitment has an axis and a registration feature. The fitment is sealed within a bottle neck in a position in which the registration feature has a predetermined orientation to the bottle neck rotationally about the axis. Preferably, the fitment has a screw thread defining a limit of rotation for a bottle cap to be screwed onto the fitment. The registration feature has a predetermined orientation to the screw thread rotationally about the axis, whereby the limit of rotation also has a predetermined orientation to the bottle neck rotationally about the axis.

5 Claims, 8 Drawing Sheets

(56) References Cited

U.S. PATENT DOCUMENTS

| | | |
|---|---|---|
| 5,303,837 A | 4/1994 | Adams et al. |
| 5,304,265 A | 4/1994 | Keeler |
| 5,473,857 A | 12/1995 | Keeler |
| 6,142,344 A | 11/2000 | Kai |
| 6,237,784 B1 | 5/2001 | Primiano |
| 6,892,508 B2 | 5/2005 | Skinner et al. |
| 7,147,597 B2 | 12/2006 | Wilkes |
| 2010/0072679 A1 | 3/2010 | Wilkes |
| 2011/0056965 A1 | 3/2011 | Peer et al. |
| 2011/0069908 A1 | 3/2011 | Wilkes et al. |
| 2011/0095059 A1 | 4/2011 | Giraud et al. |
| 2011/0220652 A1 | 9/2011 | Corbett et al. |

* cited by examiner

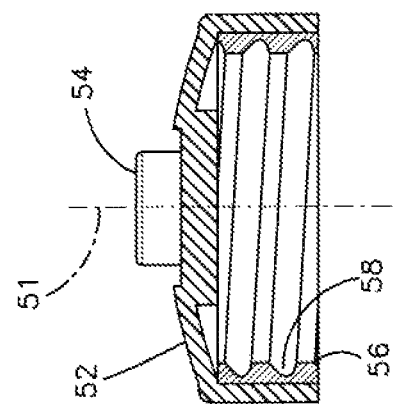
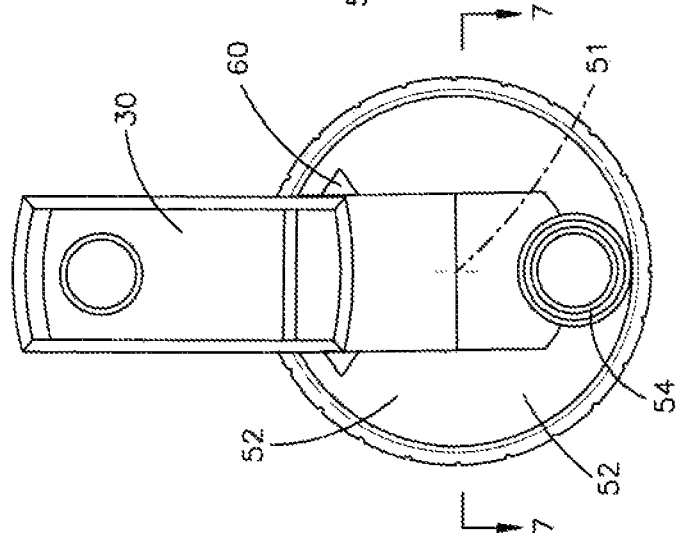
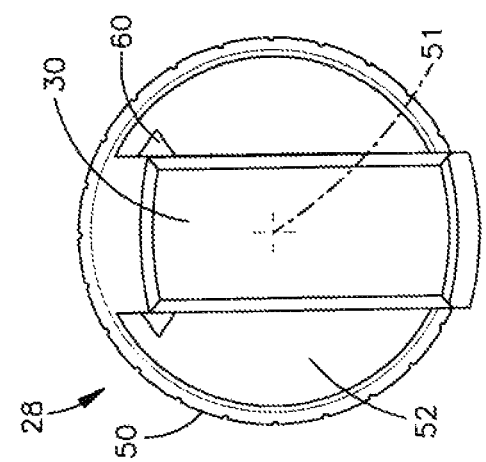

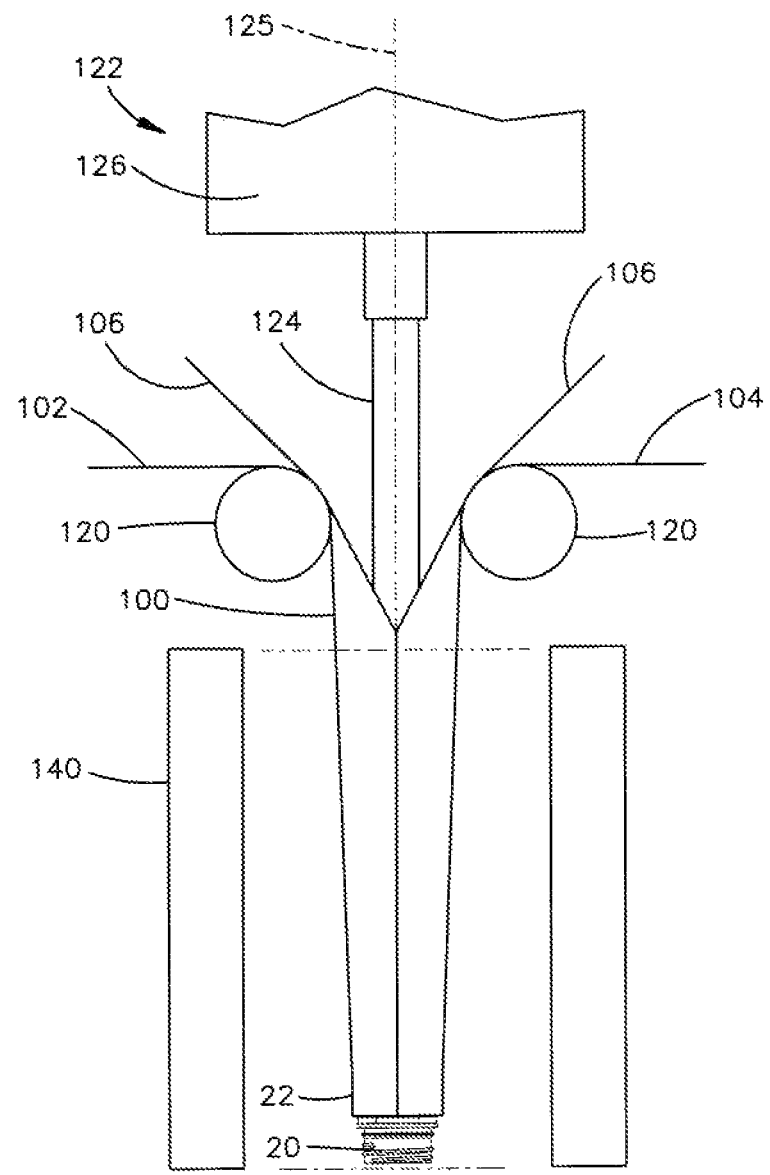

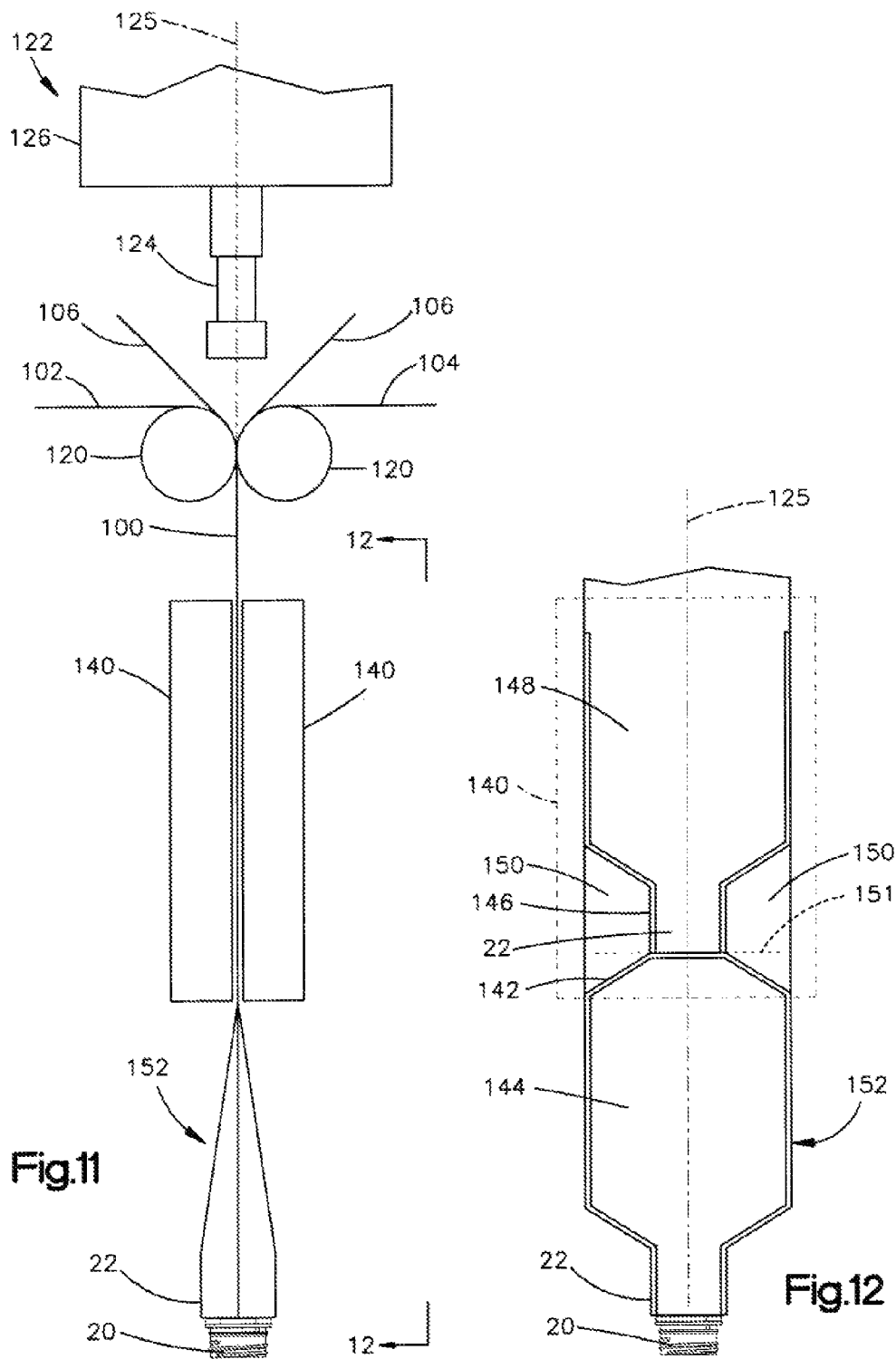

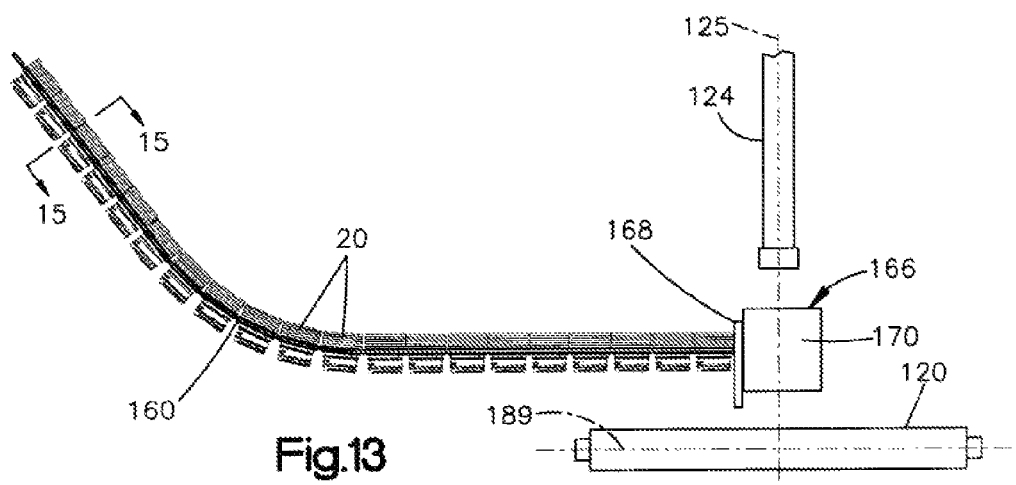
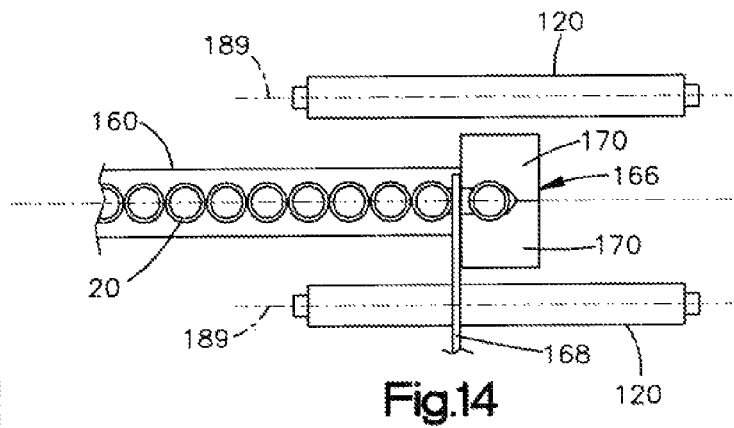
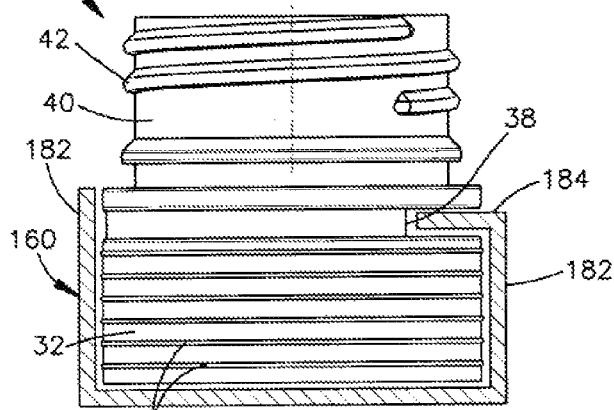

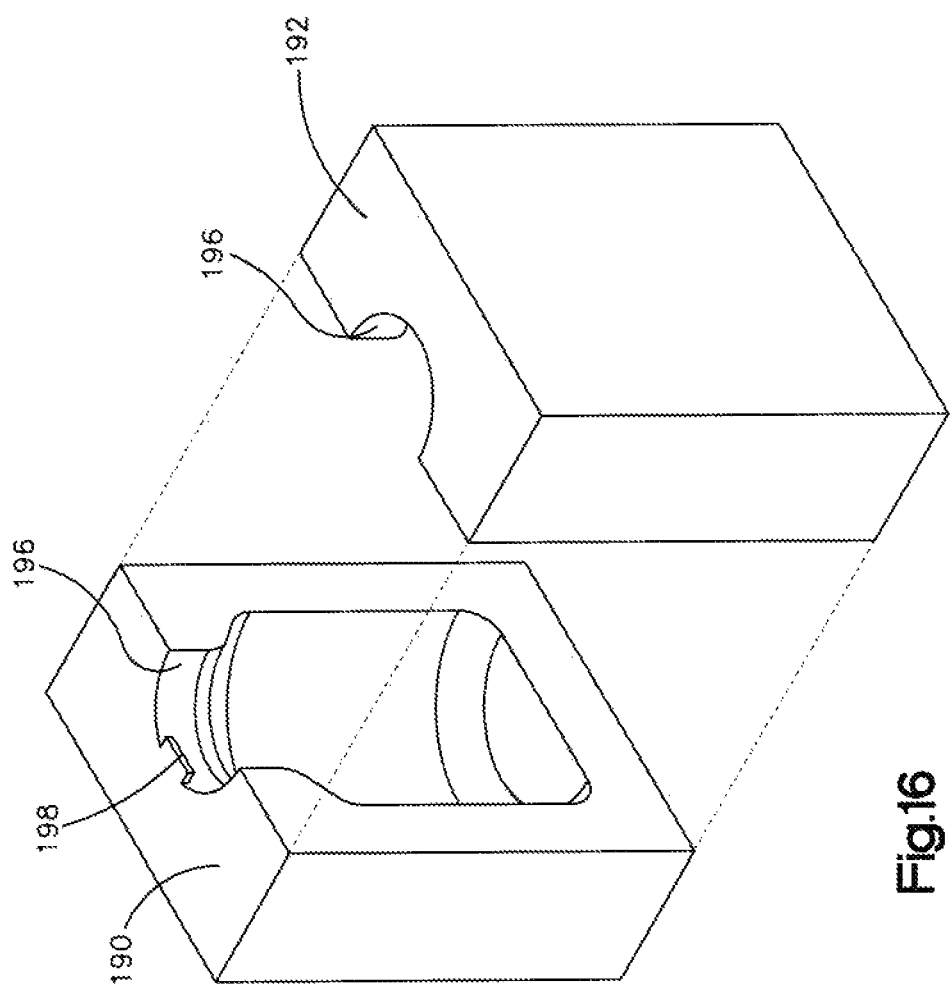

BOTTLE REGISTRATION FEATURE

RELATED APPLICATIONS

This application claims the priority benefit of provisional U.S. patent application Ser. No. 61/550,482, filed Oct. 24, 2011.

TECHNICAL FIELD

This technology includes bottles that have fitments installed in the bottle necks.

BACKGROUND

Plastic bottles can be formed from plastic film. One or more webs of the plastic film are unrolled from spools, and are folded and seamed together to form structures known as preforms. Each preform corresponds to an individual bottle, and has a generally flat shape defined by the flat panels of plastic film. A fitment may be installed in the neck of the preform to provide a spout. The preform is then placed inside a blow-molding cavity that has the size and shape of the bottle, and is expanded under fluid pressure inside the cavity. This deflects the plastic film into the shape of the bottle.

SUMMARY

A cylindrical fitment has an axis and a registration feature. The fitment is sealed within a bottle neck in a position in which the registration feature has a predetermined orientation to the bottle neck rotationally about the axis.

Preferably, the fitment has a screw thread defining a limit of rotation for a bottle cap to be screwed onto the fitment. The registration feature has a predetermined orientation to the screw thread rotationally about the axis. Accordingly, the limit of rotation also has a predetermined orientation to the bottle neck rotationally about the axis.

In a method of assembling a bottle with a fitment, a cylindrical fitment is mounted on an insertion tool in a position in which a registration feature on the fitment has a predetermined orientation to the insertion tool rotationally about an axis of the insertion tool. The insertion tool is moved to a position in which the mounted fitment is located within a bottle neck, and in which the insertion tool has a predetermined orientation to the bottle neck rotationally about the axis. This establishes a predetermined orientation of the fitment relative to the bottle neck rotationally about the axis. The fitment can then be secured to the bottle neck in the established orientation.

The bottle neck is preferably defined by a plastic bottle preform web structure. The secured fitment and the web structure are placed into a blow-molding cavity in a position in which the registration feature on the fitment has a predetermined orientation rotationally relative to a registration feature of the mold cavity. This establishes a predetermined rotational orientation between the web structure and the mold cavity. The web structure can then be blow-molded into a bottle having a predetermined rotational orientation with the fitment.

BRIEF DESCRIPTION OF THE DRAWINGS

FIG. 5 is a top view showing the bottle cap of FIG. 1 in a closed condition.

FIG. 6 is a top view showing the bottle cap of FIG. 1 in an open condition.

FIG. 7 is a sectional view taken on line 7-7 of FIG. 6.

FIG. 8 is a sectional view of a plastic film web structure.

FIG. 9 is a schematic view of a bottle assembly apparatus.

FIGS. 10 and 11 are schematic views similar to FIG. 9, showing parts in different positions.

FIG. 12 is a schematic view taken on line 12-12 of FIG. 11.

FIG. 13 is a partly schematic view showing other parts of a bottle assembly apparatus.

FIG. 14 is a top view of parts shown in FIG. 13.

FIG. 15 is a partly sectional view taken on line 15-15 of FIG. 13.

FIG. 16 is a perspective view of a blow molding apparatus.

DETAILED DESCRIPTION

Figure 1:
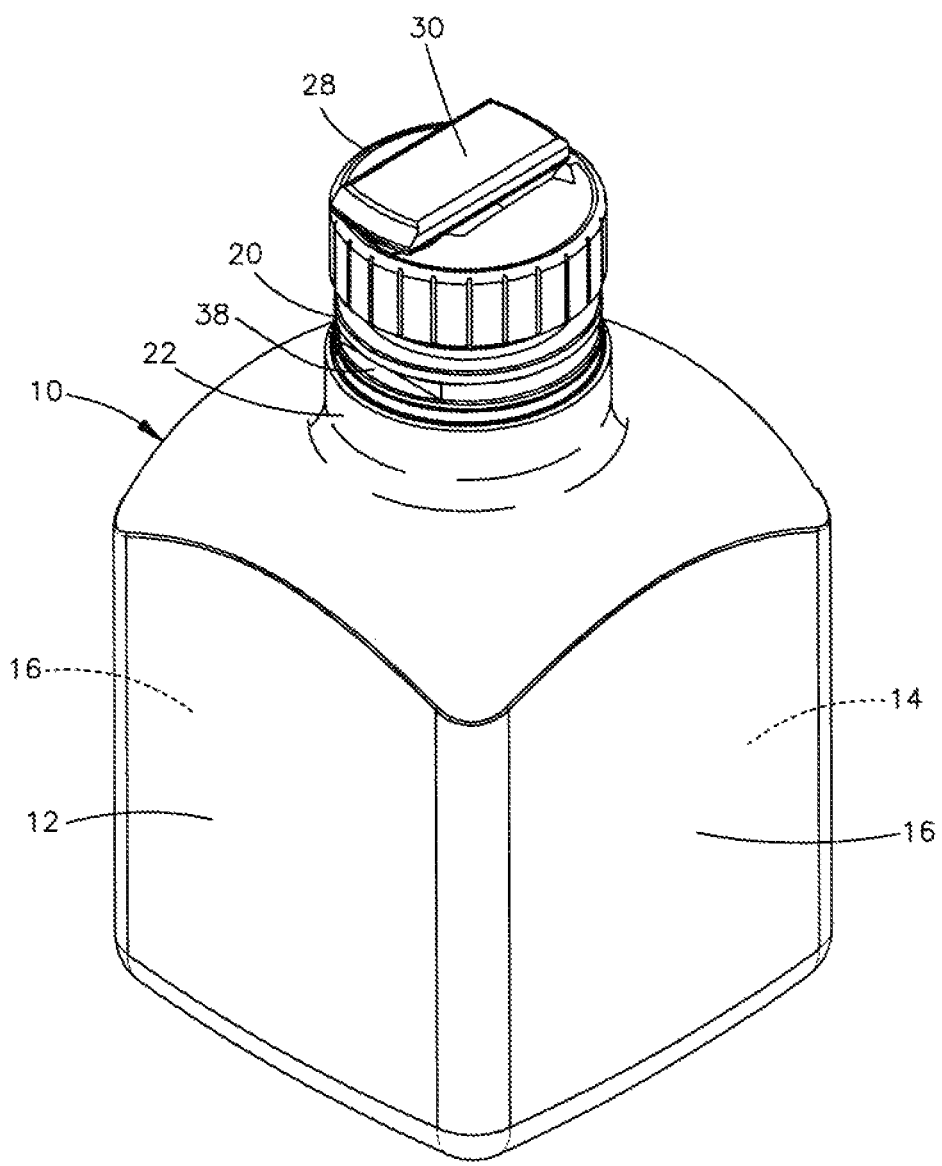
FIG. 1 is a perspective view of a bottle with a fitment and a bottle cap screwed onto the fitment.

A plastic bottle 10 is shown in FIG. 1. In this particular embodiment, the bottle 10 has a square cross-sectional shape with a front face 12, a rear face 14, and a pair of opposite side faces 16. A fitment 20 projects upward from a neck portion 22 of the bottle 10. The fitment 20 is configured and arranged to receive a bottle cap 28 in a specified position relative to the neck 22 and other parts of the bottle 10. Specifically, when the cap 28 is screwed fully onto the fitment 20 as shown in FIG. 1, a non-cylindrical portion 30 of the cap 28 has a predetermined orientation relative to the front face 12 of the bottle 10.

Figure 2:
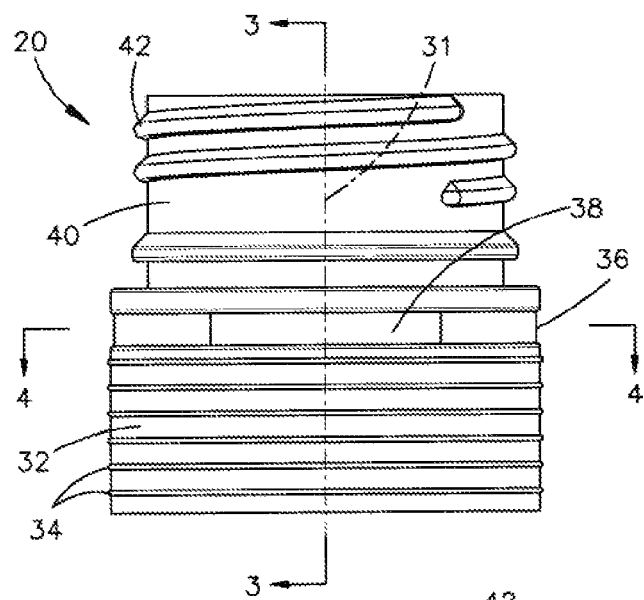
FIG. 2 is a side view of the fitment of FIG. 1.
Figure 3:
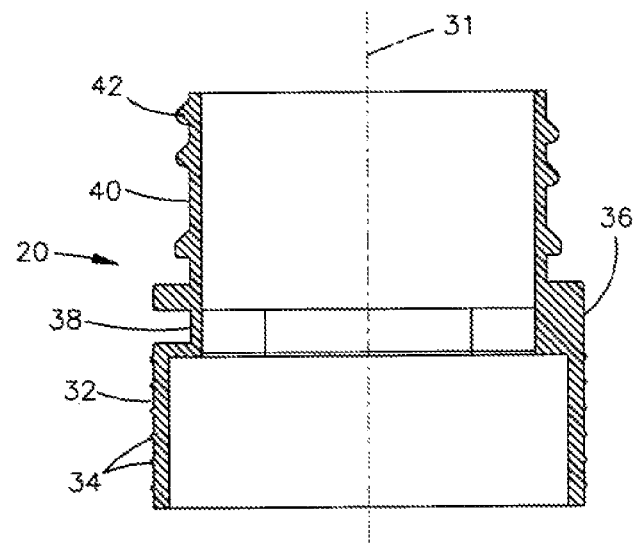
FIG. 3 is a sectional view taken on line 3-3 of FIG. 2.
Figure 4:
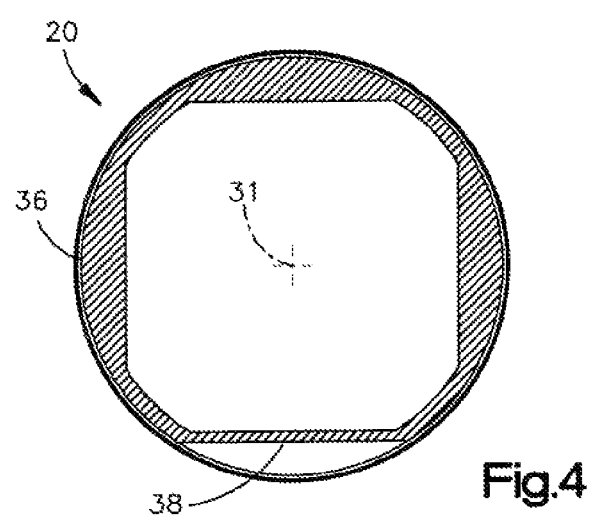
FIG. 4 is a sectional view taken on line 4-4 of FIG. 2.
Figure 10:
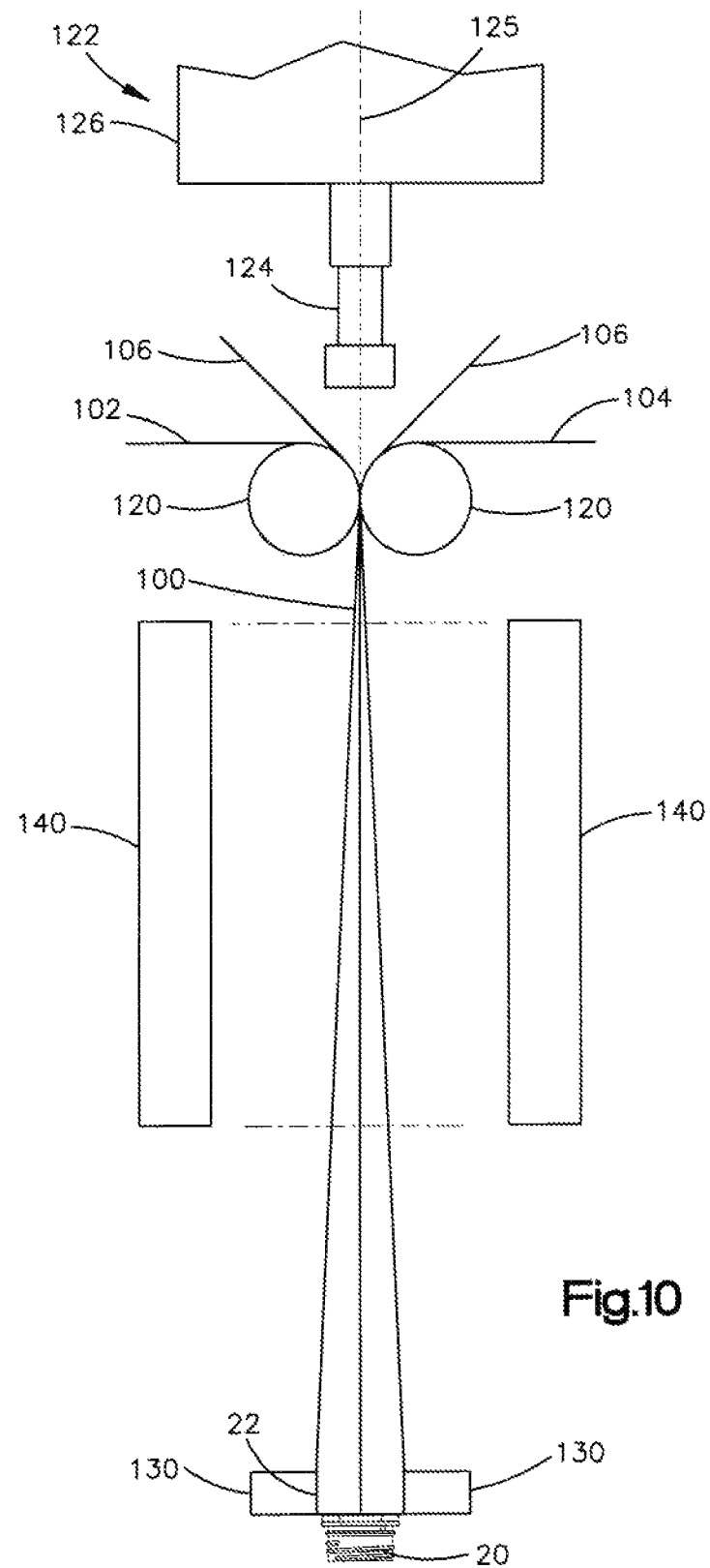

As shown in greater detail in FIGS. 2-4, this example of a fitment 20 is a cylindrical tube with a central axis 31. A lower section 32 of the fitment has ribs 34 for gripping to the bottle neck 22. An intermediate section 36 of the fitment 20 has a registration feature. In the preferred embodiment the registration feature is a flat 38 that extends lengthwise as chord relative to the circular peripheral shape of the fitment 20. An upper section 40 of the fitment 20 has a screw thread 42.

The screw thread 42 on the upper section 40 of the fitment 20 is configured for the cap 28 to be screwed onto the fitment 20, and defines a limit of rotation of the cap 28 about the axis 31 relative to the fitment 20. The flat 38 on the fitment 20 has a predetermined orientation circumferentially about the axis 31 relative to the limit of rotation defined by the screw thread 42. This ensures that the cap 28 will have a correspondingly predetermined orientation relative to the fitment 20 rotationally about the axis 31 when the cap 28 is screwed fully onto the fitment 20.

As shown in greater detail in FIGS. 5-7, the cap 28 has a short cylindrical body 50 with a central axis 51. A top wall 52 of the body 50 has a spout 54. An insert 56 is fitted closely into the body 50 from beneath, and has a screw thread 58 for engaging the screw thread 42 on the fitment 20.

The non-cylindrical portion 30 of the cap 28 is a feature that renders it asymmetrical circumferentially about the axis 51. In the illustrated embodiment, the non-cylindrical portion 30 of the cap 28 is a rectangular flip-top extending diametrically across the top wall 52. A hinge 60 enables the flip-top 30 to move pivotally back and forth between the closed and open positions of FIGS. 5 and 6. In accordance with the predetermined rotational orientations of the cap 28 and the fitment 20, the flip-top 30 in this example extends longitudinally in a direction perpendicular to the lengthwise direction of the flat 38 when the cap 28 is screwed fully onto the fitment 20.

The bottle 10 in the illustrated embodiment is formed from a plastic film web structure. FIG. 8 shows an example of a web structure 100 that can be used to manufacture the bottle 10. In this cross-sectional view, the web structure 100 is shown to include four panels of plastic film. These include a front panel 102, a rear panel 104, and two gusseted side panels 106. The web panels 102-106 are arranged together along the length of the web structure 100 to form multiple bottles 10 having the front, rear and side faces 12, 14 and 16 shown in FIG. 1.

FIGS. 9-12 show a method and apparatus for assembling parts of the bottle 10. The web panels 102, 104, and 106 are fed lengthwise between a pair of rollers 120 to form the web structure 100 downstream of the rollers 120. A fitment insertion tool 122 includes a mandrel 124 with an axis 125, and further includes a driver 126 that is operative to advance and retract the mandrel 124 axially into and out of the web structure 100.

When the mandrel 124 is being advanced toward the position shown in FIG. 9, it carries a fitment 20 toward and between the panels 102-106 to place the fitment 20 within the web structure 100. The mandrel 124 is then retracted. In the next step, a pair of grippers 130 (FIG. 10) move into engagement with the fitment 20. The grippers 130 form a heat seal that fixes the fitment 20 to the web structure 100, and also pull the fitment 20 and the web structure 100 downward from the position of FIG. 9 to the position of FIG. 10 to advance another section of the web structure 100 downward between the rollers 120. A seaming press 140 then acts upon the web structure 100 to form seams that attach the panels 102-106 together, as shown in FIG. 11.

Specifically, as shown in FIG. 12, the seaming press 140 forms seams 142 at the bottom of the leading section 144 of the web structure 100, and forms seams 146 at the top and sides of a trailing section 148 of the web structure 100. This forms the neck 22 in which the fitment 20 is to be inserted. The seaming press 140 also cuts out extraneous portions 150 of the web structure 100, and severs the leading section 144 from the trailing section 148 at a cut line 151. The leading section 144 is thus assembled as a bottle preform 152 with a neck 22, and the process repeats to form multiple bottle preforms 152 successively in this manner.

As thus far described, the method and apparatus for forming a preform web structure, and for inserting a fitment into the neck of a preform web structure, are substantially similar to the method and apparatus disclosed in U.S. Pat. No. 7,147,597, which is incorporated by reference. U.S. patent application Ser. No. 12/813,216, filed Jun. 10, 2010, which also is incorporated by reference, describes additional web-forming and fitment insertion methods and apparatus that are suitable for adaptation to the present invention.

In the preferred method of inserting a fitment with a registration feature, a track 160 (FIGS. 13-15) feeds the fitments 20 to the mandrel 124. The track 160 is inclined so that fitments 20 loaded at the upper end of the track 160 will slide toward the lower end under the force of gravity. When a fitment 20 reaches a gate 166 at the lower end of the track 160, a spacer bar 168 is moved across the track 160 to interrupt movement of the fitments 20. The mandrel 124 is then moved downward into engagement with the fitment 20 in the gate 166, and sections 170 of the gate 166 are opened to allow the mandrel 124 to move the engaged fitment 20 downward into the web structure 100 as described above. The spacer bar 168 is then retracted to allow the next successive fitment 20 into the gate 166.

As shown in FIG. 15, the track 160 in this example has a pair of side walls 182 that are spaced apart a distance that is just slightly greater than the diameter of a fitment 20 at the lower section 32 of the fitment 20. A rail 184 projects transversely inward from one side wall 182 at the height of the flat 38 on a fitment 20. The track 160 thus configured to receive a row of the fitments 20, with the flats 38 on the fitments 20 adjoining an inner edge of the rail 184. This permits a fitment 20 to be mounted on the track 160 in only one orientation rotationally about the axis 31 of the fitment 20. The track 160 delivers the fitment 20 to the mandrel 124 in the same orientation rotationally about the axis 125 of the mandrel 124.

The orientation of the fitment 20 on the mandrel 124 has a predetermined relationship to the web structure 100. In the illustrated embodiment, this is accomplished by advancing the fitments 20 along the track 160 toward the mandrel 124 in a direction parallel to the axes 189 of the rollers 120 that guide the panels 102-106 together into the configuration of the web structure 100. When the mandrel 124 moves the fitment 20 into the web structure 100 along the axis 125, it does not rotate the fitment 20 about the axis 125, but instead maintains the fitment 20 fixed relative to the rollers 120 and the web structure 100 rotationally about the axis 125. In this example, the mandrel 124 thus inserts each fitment 20 into the web structure 100 in an orientation in which the flat 38 extends lengthwise in a direction parallel to the front and rear panels 102 and 104. The fitment 20 is then heat-sealed to the neck portion 22 of the bottle preform 152 in the same orientation rotationally relative to the web structure 100. This provides a correspondingly predetermined orientation between the panels 102, 104 and 106 of the preform 152, the flat 38 on the fitment 20, and the rotational limit of the bottle cap 28 on the fitment 20. In the illustrated embodiment, that predetermined orientation ensures that the flip-top portion 30 of the cap 28 will extend lengthwise in a direction perpendicular to the front and rear faces 12 and 14 of the finished bottle 10, with the hinge 60 at the rear, when the cap 28 is screwed fully onto the fitment 20 as shown in FIG. 1.

Although the given example of a fitment 20 has a single flat 38, multiple flats 38 or other registration features could provide multiple corresponding orientations between the panels 102, 104 and 106 of the preform 152, the registration feature on the fitment 20, and the rotational limit of the bottle cap 28 on the fitment 20. For example, a pair of flats 38 at diametrically opposite locations on the fitment 20 would provide a pair of orientations that are offset from each other by 180 degrees.

As shown in FIG. 16, a pair of mold structures 190 and 192 are configured to receive the preform 152 for blow-molding of the preform 152 into a finished bottle 10. When the mold structures 190 and 192 are closed, they define a mold cavity in which the front, rear, and side panels 102, 104 and 106 of the preform 150 are expanded to the size and shape of the front, rear, and side faces 12, 14 and 16 of the bottle 10. Neck portions 196 of the mold structures 190 and 192 together correspond to the neck portion 22 of the bottle 10. One of the neck portions 196 has a registration feature in the form of a rail 198 projecting radially inward. The rail 198 on the mold structure 190 is configured to register with the flat 38 on the fitment 20 in the preform 152. This helps to ensure that the panels 102, 104 and 106 of the preform 152 will be expanded into a bottle 10 in which the fitment 20, and a bottle cap 28 screwed onto the fitment 20, will have the predetermined rotational orientations described above.

This written description sets forth the best mode of carrying out the invention, and describes the invention so as to enable a person skilled in the art to make and use the invention, by presenting examples of elements recited in the claims. The patentable scope of the invention is defined by the claims, and may include other examples that occur to those skilled in the art. Such other examples, which may be available either before or after the application filing date, are intended to be within the scope of the claims if they have elements that do not differ from the literal language of the claims, or if they have equivalent elements with insubstantial differences from the literal language of the claims.

The invention claimed is:

1. A method comprising:
    mounting a cylindrical fitment on an insertion tool in a position in which a registration feature on the fitment has a predetermined orientation to the insertion tool rotationally about an axis of the insertion tool;
    moving the insertion tool to a position in which the mounted fitment is located within a bottle neck, and in which the insertion tool has a predetermined orientation to the bottle neck rotationally about the axis, and thereby establishing a predetermined orientation of the mounted fitment relative to the bottle neck rotationally about the axis; and
    permanently securing the fitment to the bottle neck in the established orientation.

2. A method as defined in claim 1 wherein the moving step includes moving the insertion tool from a retracted position in which the fitment is mounted on the insertion tool to an advanced position in which the fitment is located within bottle neck, and the insertion tool is maintained in the predetermined orientation to the bottle neck rotationally about the axis while being moved from the retracted position to the advanced position.

3. A method as defined in claim 1 wherein the mounting step mounts the fitment on the insertion tool in a position in which a screw thread for a bottle cap on the fitment also has a predetermined orientation to the insertion tool rotationally about the axis of the insertion tool.

4. A method as defined in claim 1 wherein the bottle neck is defined by a plastic bottle preform web structure, and further comprising:
    placing the secured fitment and the preform web structure into a blow-molding cavity in a position in which the registration feature on the fitment has a predetermined orientation rotationally relative to a registration feature of the mold cavity, and thereby establishing a predetermined rotational orientation between the preform web structure and the mold cavity.

5. A method as defined in claim 4 further comprising the step of blow-molding the preform web structure in the blow-molding cavity to form a bottle having a predetermined rotational orientation with the fitment.

* * * * *